(12) United States Patent
Aoki et al.

(10) Patent No.: US 6,680,665 B2
(45) Date of Patent: Jan. 20, 2004

(54) THREE-PHASE CURRENT TRANSFORMER

(75) Inventors: Hirohide Aoki, Tokyo (JP); Yasuhiro Maeda, Tokyo (JP); Hiroyuki Hama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/932,964

(22) Filed: Aug. 21, 2001

(65) Prior Publication Data

US 2002/0125978 A1 Sep. 12, 2002

(30) Foreign Application Priority Data

Mar. 6, 2001 (JP) .......................................... 2001-061757

(51) Int. Cl.[7] .............................................. H01F 38/20
(52) U.S. Cl. ..................... 336/174; 336/84 R; 336/175; 336/229; 336/173
(58) Field of Search ................................. 336/174, 175, 336/178, 229, 173, 84 R, 84 C, 84 M

(56) References Cited

U.S. PATENT DOCUMENTS 4,702,002 A * 10/1987 Morris et al. .................. 29/837

FOREIGN PATENT DOCUMENTS

| DE | 7833955 U1 | 3/1979 |
| DE | 29611469 U1 | 10/1996 |
| EP | 0 011 590 A1 | 5/1980 |
| EP | 0 849 600 A1 | 6/1998 |
| EP | 0 933 639 A2 | 8/1999 |
| JP | 01-293512 | * 11/1989 |
| JP | 10-185961 | 7/1998 |

* cited by examiner

Primary Examiner—Tuyen T. Nguyen
(74) Attorney, Agent, or Firm—Leydig, Voit & Mayer, Ltd.

(57) ABSTRACT

In a three-phase current transformer, a plate adaptor includes first to third coil insertion slots and is a magnetic shield. First to third Rogowskii coils are arranged in the first to third coil insertion slots. The metal adaptor is fixed with a phase-to-phase magnetic shield and an outer peripheral magnetic shield. An end magnetic shield is fixed to an end portion of the phase-to-phase magnetic shield.

8 Claims, 7 Drawing Sheets

THREE-PHASE CURRENT TRANSFORMER

BACKGROUND OF THE INVENTION

1. Field of the Invention

The present invention relates to a current transformer disposed in a three-phase gas insulated switch device or gas insulated bus, or the like, for detecting a current that flows in a three-phase conductor, and more particularly to a three-phase current transformer in which three air-core coils are received in a pressure vessel together.

2. Description of the Related Art

Conventionally, current transformers using analog signals as a secondary information transmission signal have been widely employed. In current transformers of this type, a current value of a main circuit is detected by using an iron core coil, and the current value thus detected is outputted to the secondary system. Also, an iron core having a large sectional area is employed as the iron core coil. This is because some degree of electric power needs to be ensured in order to operate an electromagnetic relay or the like, and in order prevent deterioration in detection precision due to magnetic saturation.

However, in recent years, digitalization of secondary information transmission signals has advanced. In a current transformer that outputs a digital signal, since only a small amount of electric power needs to be ensured, an air-core coil such as a Rogowskii coil having a small sectional area and no magnetic saturation is used.

Since the iron core used for the iron core coil is made of a ferromagnetic material, a magnetic flux developed by a current that flows in each phase is absorbed into the iron core. For that reason, in the case where the iron core coil is used for a three-phase package type current transformer, the magnetic influence on the coils of other phases is slight. However, because air-core coils such as Rogowskii coils are made of non-magnetic materials such as a high polymer member, the magnetic flux developed by the current of each phase reaches other phases, and the magnetic influence imparted to the coils of the other phases is large. Therefore, in three-phase package type current transformers using air-core coils, a magnetic shield must be provided between the respective phases.

FIG. 8 is a cross-sectional view of a conventional three-phase package type current transformer disclosed in, for example, Japanese Patent Laid-open No. Hei 10-185961. In the figure, three conductors 2a to 2c are received in a cylindrical pressure vessel 1 that is filled with SF6 gas, an insulating and arc-extinguishing gas. Three-phase conductor is comprised of the conductors 2a to 2c. The conductors 2a to 2c are surrounded by first to third Rogowskii coils 3a to 3c which are air-core coils. The first to third Rogowskii coils 3a to 3c are current sensors that obtain current signals proportional to the values of currents that flow in the conductors 2a to 2c. A plurality of magnetic shields 4 for moderating the influence of the magnetic field from other phases are disposed between the respective conductors 2a to 2c.

In the conventional three-phase package type current transformer thus structured, because the first to third Rogowskii coils 3a to 3c are individually fixed in the pressure vessel 1, the structure for supporting the first to third Rogowskii coils 3a to 3c becomes complicated.

SUMMARY OF THE INVENTION

The present invention has been made to solve the above-described problems, and therefore an object of the present invention is to provide a three-phase package type current transformer that can simplify the structure for supporting the air-core coils in the interior of the pressure vessel.

To this end, according to one aspect of the present invention, there is provided a three-phase package type current transformer that is received in a pressure vessel which is filled with an insulating gas, for detecting a current that flows in a three-phase conductor having at least three conductors and arranged within the pressure vessel; the current transformer comprising: a metal adaptor fixed in the interior of the pressure vessel, and having first to third conductor through-holes through which the conductors are inserted and first to third annular coil insertion slots formed in the periphery of the first to third conductor through-holes; and first to third air-core coils disposed in the first to third coil insertion slots; wherein the metal adaptor has a ground potential and serves as a magnetic shield.

According to another aspect of the present invention, there is provided a three-phase package type current transformer that is received in a pressure vessel which is filled with an insulating gas, for detecting a current that flows in a three-phase conductor having at least three conductors and arranged within the pressure vessel; the current transformer comprising: a plate-like insulating spacer having first to third conductor through-holes through which the conductors are inserted, first to third annular spacer slots formed in the periphery of the first to third conductor through-holes, fixed in the interior of the pressure vessel, and supporting the three-phase conductor while electrically insulating the three-phase conductor with respect to the pressure vessel; and first to third air-core coils disposed in the first to third spacer slots.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

First Embodiment

Figure 1:
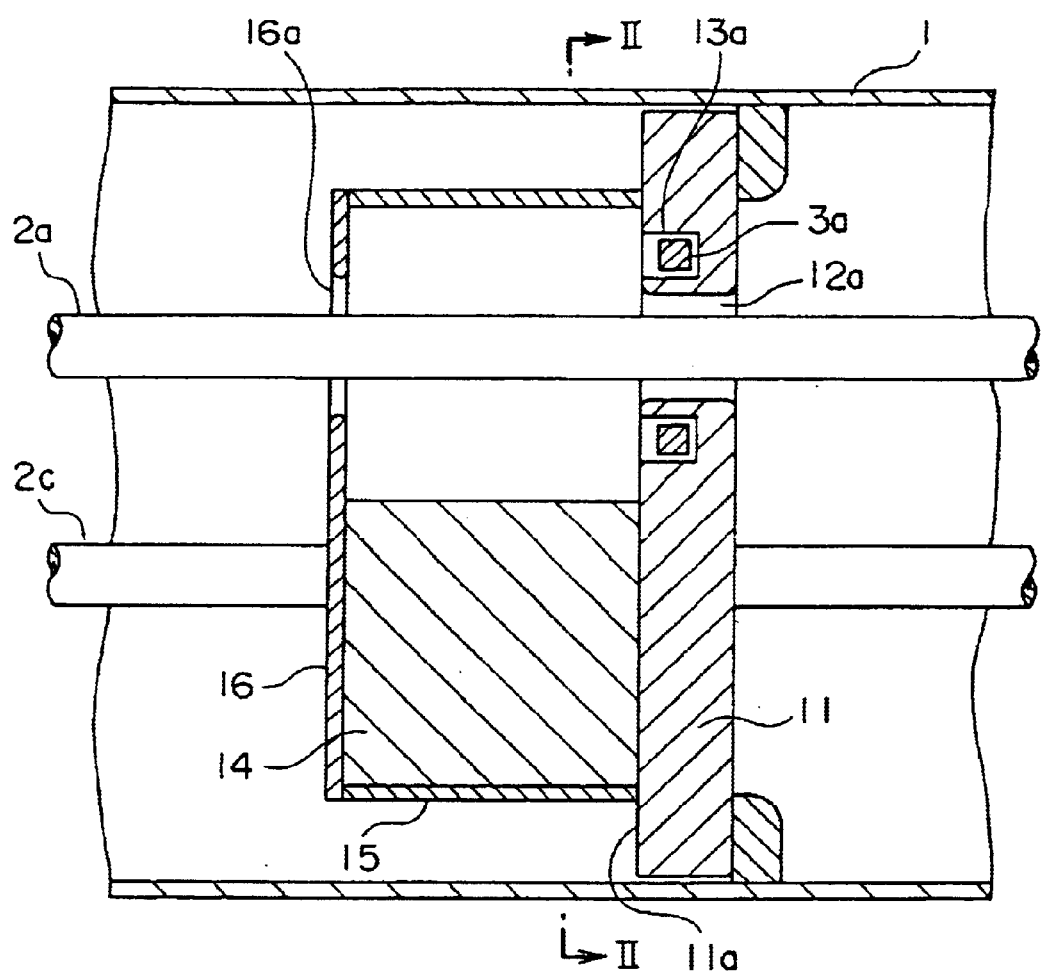
FIG. 1 is a cross-sectional view of a three-phase package type current transformer in accordance with a first embodiment of the present invention.
Figure 2:
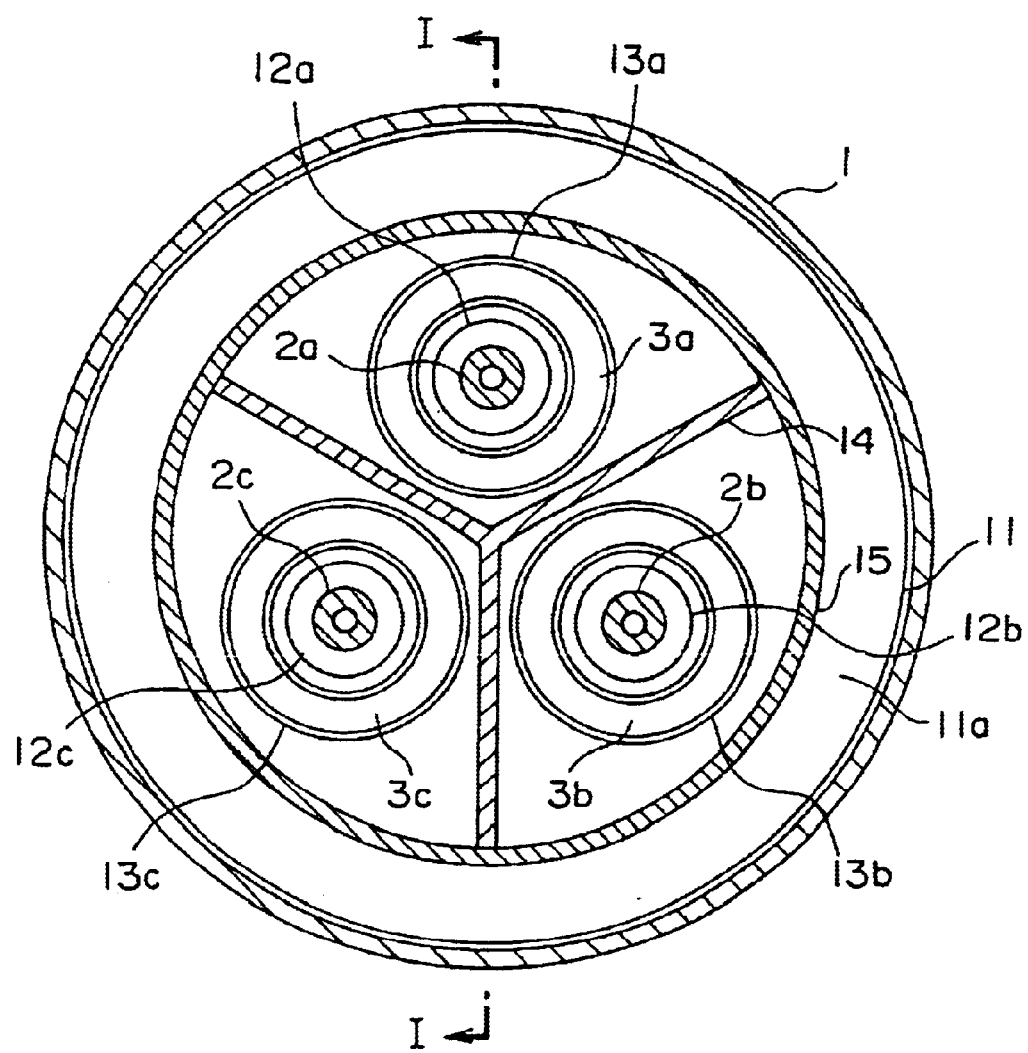
FIG. 2 is a cross-sectional view taken along a line II—II of FIG. 1.

FIG. 1 is a cross-sectional view of a three-phase package type current transformer in accordance with a first embodiment of the present invention, and FIG. 2 is a cross-sectional view taken along a line II—II of FIG. 1. FIG. 1 is a cross-sectional view taken along a line I—I of FIG. 2.

In the figures, three conductors 2a to 2c are received within a cylindrical pressure vessel 1 that is filled with SF6 gas, an insulating and arc-extinguishing gas. Three-phase conductor is comprised of the conductors 2a to 2c. Also, a plate-like (disc-like) metal adaptor 11 is fixed to the interior of the pressure vessel 1. The metal adaptor 11 has first to third conductor through-holes 12a to 12c into which the conductors 2a to 2c are inserted.

Also, the metal adaptor 11 has a coil insertion surface 11a which is parallel with planes orthogonal to the conductors 2a to 2c. First to third annular coil insertion slots 13a to 13c are formed in the peripheries of the first to third conductor through-holes 12a to 12c of the coil insertion surface 11a.

First to third annular Rogowskii coils 3a to 3c which are first to third air-core coils are disposed within the first to third coil insertion slots 13a to 13c, respectively. The conductors 2a to 2c are surrounded by the first to third Rogowskii coils 3a to 3c.

The first to third Rogowskii coils 3a to 3c are disposed within the first to third coil insertion slots 13a to 13c so as to be spaced from the inner wall surfaces of the first to third coil insertion slots 13a to 13c. The metal adaptor 11 has a ground potential and serves as a magnetic shield.

A plurality of phase-to-phase magnetic shields 14 that extend radially from the center of the pressure vessel 1 so as to partition the respective conductors 2a to 2c are fixed to the coil insertion surface 11a of the metal adaptor 11. Also, a cylindrical outer peripheral magnetic shield 15 that surrounds the conductors 2a to 2c and the phase-to-phase magnetic shield 14 is fixed to the coil insertion surface 11a.

A plate-like (disc-like) end magnetic shield 16 having three holes 16a through which the conductors 2a to 2c are inserted is fixed to an end portion of the phase-to-phase magnetic shield 14 opposite to the metal adaptor 11.

In the three-phase package type current transformer thus structured, because the first to third Rogowskii coils 3a to 3c are disposed within the first to third coil insertion slots 13a to 13c disposed in the common metal adaptor 11, the first to third Rogowskii coils 3a to 3c can be fixed in the interior of the pressure vessel 1 by only fixing the metal adaptor 11 to the pressure vessel 1. Therefore, the structure for supporting the first to third Rogowskii coils 3a to 3c in the interior of the pressure vessel 1 can be simplified, allowing the downsizing of the current transformer.

Also, because the metal adaptor 11 also serves as the magnetic shield, the dimensions of the current transformer in the longitudinal direction of the conductors 2a to 2c can be reduced, thereby allowing downsizing of the entire switch device. In addition, since the first to third conductor through-holes 12a to 12c and the first to third coil insertion slots 13a to 13c are formed in the single plate-like metal adaptor 11, the structure can be simplified.

Further, because the phase-to-phase magnetic shields 14 are fixed to the coil insertion surface 11a of the metal adaptor 11, the structure for supporting the phase-to-phase magnetic shield 14 can be simplified, thereby allowing downsizing of the current transformer.

In addition, since the conductors 2a to 2c and the phase-to-phase magnetic shield 14 are surrounded by the cylindrical outer peripheral magnetic shield 15, the entrance of electromagnetic waves of another phase from space between the phase-to-phase magnetic shield 14 and the pressure vessel 1 can be suppressed, thereby allowing improvements in detection precision. Also, since the outer peripheral magnetic shield 15 is fixed to the coil insertion surface 11a, the structure for supporting the outer peripheral magnetic shield 15 can be simplified.

Also, since the end magnetic shield 16 is employed, the entrance of electromagnetic waves of another phase from the end portion of the phase-to-phase magnetic shield 14 can be suppressed, thereby allowing improvements in detection precision.

The metal adaptor 11 and the magnetic shields 14, 15 and 16 are made of a material high in conductivity (for example, copper or aluminum) in order to mitigate the influence of the magnetic field from alternating current components, a material high in magnetic permeability (for example, iron) in order to mitigate the influence of the magnetic field from direct current components, or a combination of those materials. As a result, the influence of electromagnetic waves from other phases can be efficiently removed.

Second Embodiment

Figure 3:
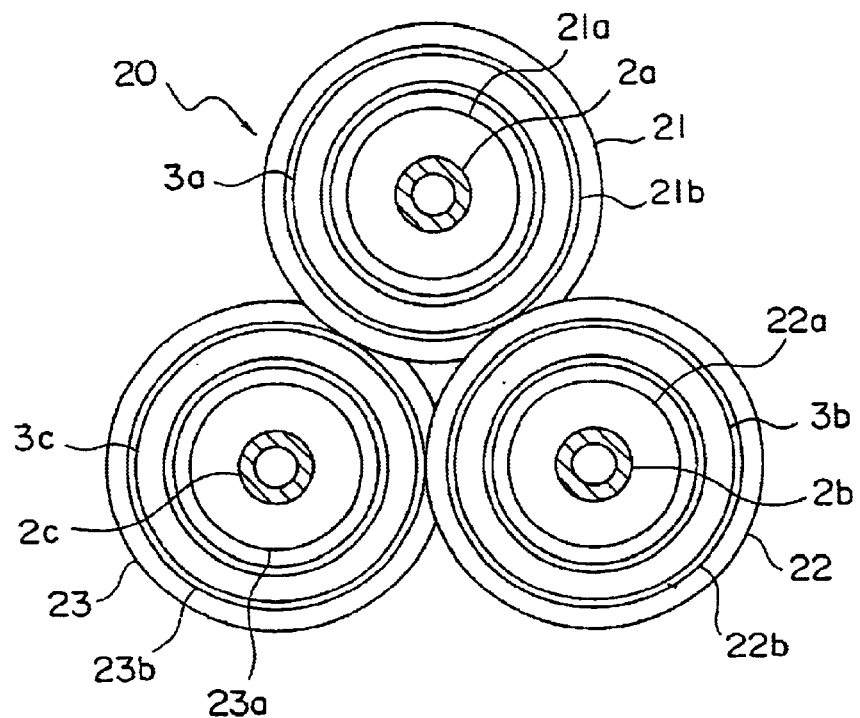
FIG. 3 is a front view showing a three-phase package type current transformer in accordance with a second embodiment of the present invention.
Figure 4:
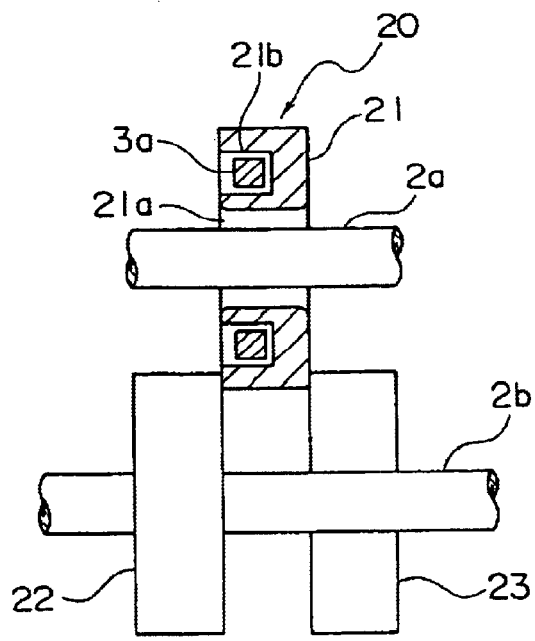
FIG. 4 is a partially-sectional side view showing the three-phase package type current transformer of FIG. 3.

FIG. 3 is a front view showing a three-phase package type current transformer in accordance with a second embodiment of the present invention, and FIG. 4 is a partially-sectional side view showing the three-phase package type current transformer of FIG. 3. In the figures, a metal adaptor 20 is fixed to the interior of the pressure vessel 1 shown in FIG. 1. The metal adaptor 20 has first to third metal plates 21 to 23.

The positions of the first to third metal plates 21 to 23 are displaced from each other in the longitudinal direction of the conductors 2a to 2c, and the first to third metal plates 21 to 23 are partially bonded to each other at their end surfaces in the longitudinal direction of the conductors 2a to 2c so as to be integrated with each other.

The first metal plate 21 has a first conductor through hole 21a and an annular first coil insertion slot 21b. A second conductor through-hole 22a and an annular second coil insertion slot 22b are formed in the second metal plate 22. A third conductor through-hole 23a and an annular third coil insertion slot 23b are formed in the third metal plate 23.

The first to third Rogowskii coils 3a to 3c are disposed within the first to third coil insertion slots 21b, 22b and 23b, respectively. The conductors 2a to 2c are surrounded by the first to third Rogowskii coils 3a to 3c.

The first to third Rogowskii coils 3a to 3c are disposed within the first to third coil insertion slots 21b, 22b and 23b so as to be spaced from the inner wall surfaces of the first to third coil insertion slots 21b, 22b and 23b. The metal adaptor 20 has a ground potential and serves as a magnetic shield.

In the three-phase package type current transformer thus structured, because the first to third Rogowskii coils 3a to 3c are disposed within the first to third coil insertion slots 21b, 22b and 23b disposed in the integrated metal adaptor 20, the first to third Rogowskii coils 3a to 3c can be fixed in the interior of the pressure vessel 1 by merely fixing the metal adaptor 20 to the pressure vessel 1. Therefore, the structure for supporting the first to third Rogowskii coils 3a to 3c in the interior of the pressure vessel 1 can be simplified, thereby allowing downsizing of the current transformer.

Also, because the metal adaptor 20 also serves as the magnetic shield, the dimensions of the current transformer in the longitudinal direction of the conductors 2a to 2c can be lessened, thereby allowing downsizing of the entire switch device. Also, the positions of the first to third metal plates 21 to 23 in the longitudinal direction of the conductors 2a to 2c are displaced from each other, and the first to third metal plates 21 to 23 are fixed to each other at their end surfaces in the longitudinal direction of the conductors 2a to 2c and integrated together so as to overlap one another in the longitudinal direction of the conductors 2a to 2c. Therefore, the phase-to-phase distance can be reduced while the phase-to-phase insulation distance is ensured, thereby allowing downsizing of the current transformer.

The metal adaptor 20 is made of a material high in conductivity (for example, copper or aluminum) in order to mitigate the influence of the magnetic field from alternating current components, a material high in magnetic permeability (for example, iron) in order to mitigate the influence of the magnetic field from direct current components, or a combination of those materials. As a result, the influence of electromagnetic waves from other phases can be efficiently removed.

Third Embodiment

Figure 5:
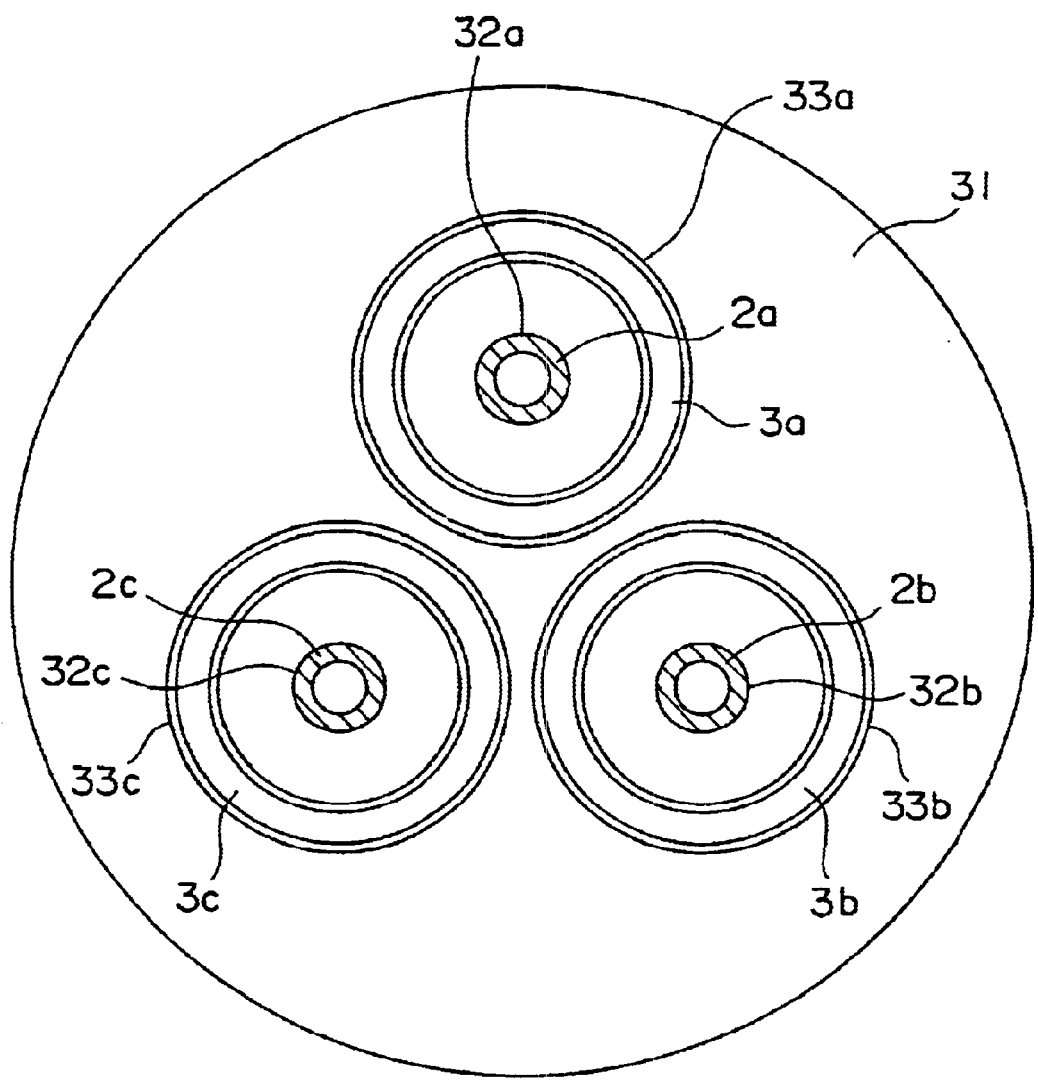
FIG. 5 is a front view showing the three-phase package type current transformer in accordance with a third embodiment of the present invention.

Next, FIG. 5 is a front view showing a three-phase package type current transformer in accordance with a third embodiment of the present invention. In the figure, a three-phase package type plate-like (disc-like) insulating spacer 31 made of an insulator is fixed in the interior of the pressure vessel 1 shown in FIG. 1. The conductors 2a to 2c are supported by the insulating spacer 31 while being electrically insulated with respect to the pressure vessel 1.

The insulating spacer 31 has first to third conductor through-holes 32a to 32c through which the conductors 2a to 2c are inserted, and first to third annular spacer slots 33a to 33c formed in the periphery of the first to third conductor through-holes 32a to 32c, respectively. The first to third Rogowskii coils 3a to 3c are disposed within the first to third spacer slots 33a to 33c so as to be spaced from the inner wall surfaces of the first to third spacer slots 33a to 33c, respectively.

In the three-phase package type current transformer thus formed, since the first to third Rogowskii coils 3a to 3c are fixed in the interior of the pressure vessel 1 by using the insulating spacer 31, the structure for supporting the first to third Rogowskii coils 3a to 3c in the interior of the pressure vessel 1 can be simplified, thereby allowing downsizing of the current transformer. Also, the material costs can be reduced, and the device space can be saved.

Fourth Embodiment

Figure 6:
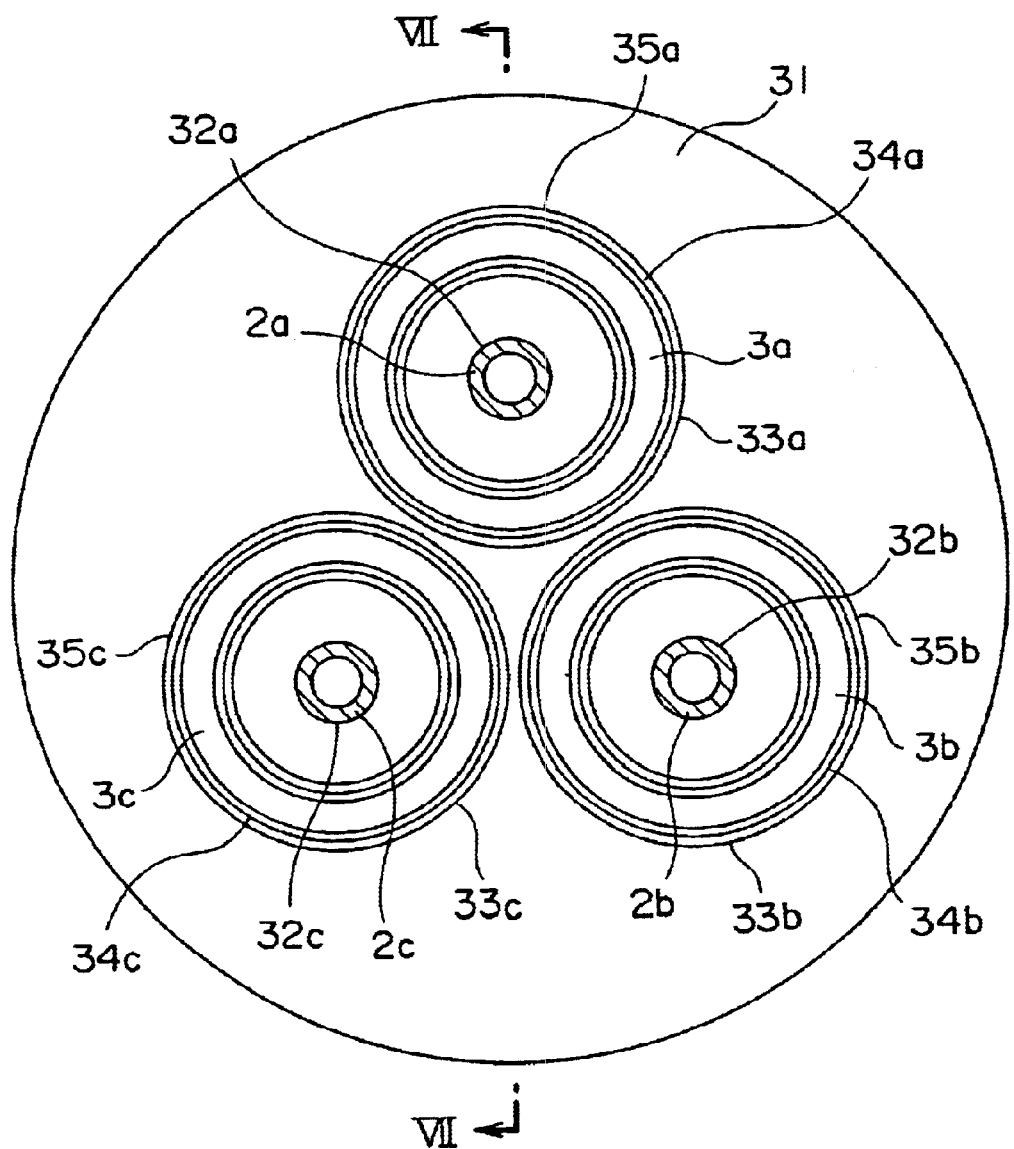
FIG. 6 is a front view of a three-phase package type current transformer in accordance with a fourth embodiment of the present invention.
Figure 7:
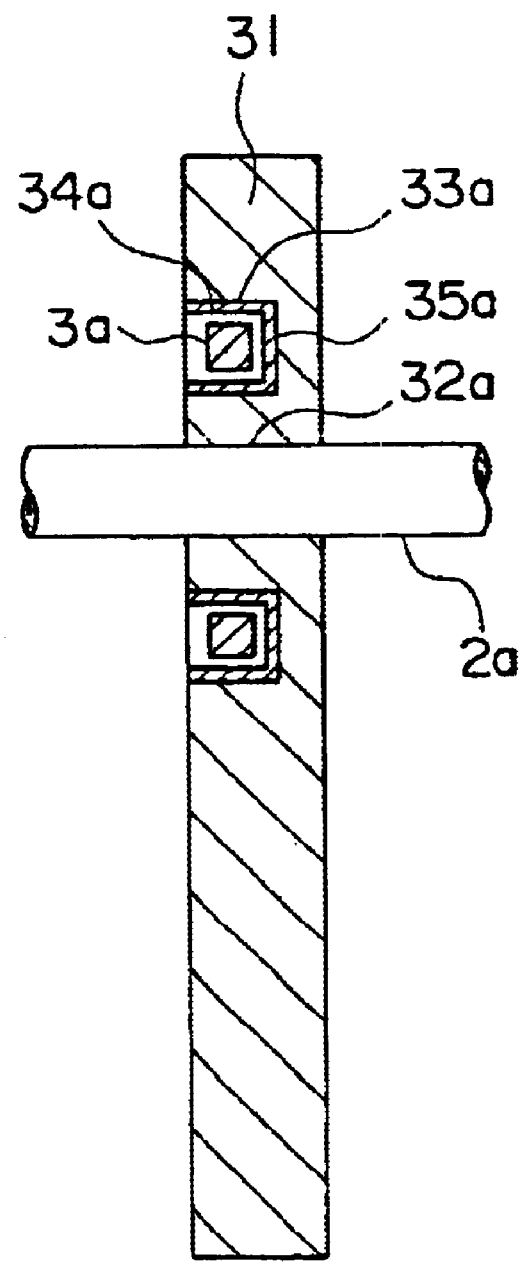
FIG. 7 is a cross-sectional view taken along a line VII—VII of FIG. 6.
Figure 8:
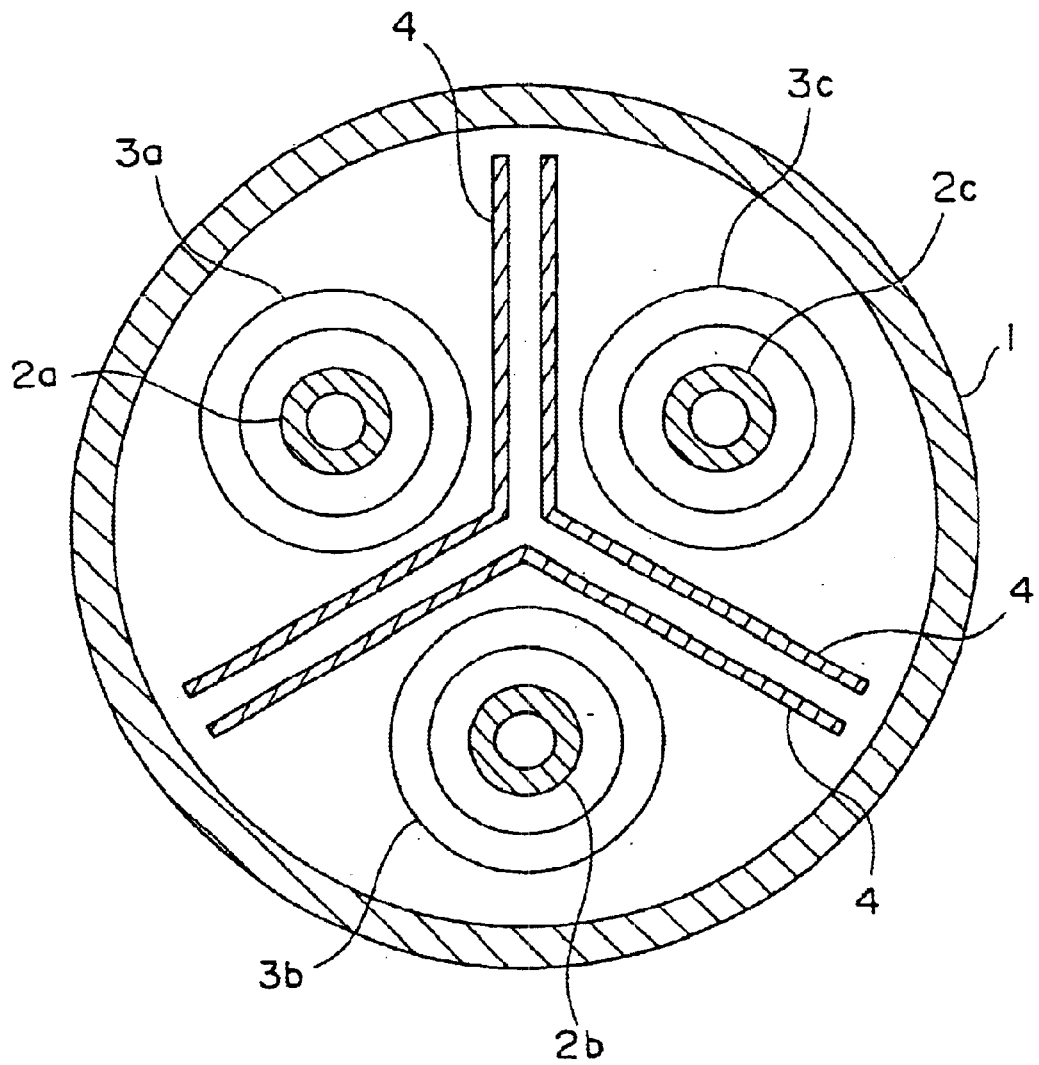
FIG. 8 is a cross-sectional view of an example of a conventional three-phase package type current transformer.

FIG. 6 is a front view of a three-phase package type current transformer in accordance with a fourth embodiment of the present invention, and FIG. 7 is a cross-sectional view taken along a line VII—VII of FIG. 6. In the figures, first to third ring-shaped metal adaptors 35a to 35c in which annular coil insertion slots 34a to 34c are formed, respectively, are arranged within the first to third spacer slots 33a to 33c.

The first to third Rogowskii coils 3a to 3c are disposed within the coil insertion slots 34a to 34c so as to be spaced from the inner wall surfaces of the first to third spacer slots 34a to 34c, respectively. The first to third adaptors 35a to 35c have a ground potential and also serve as magnetic shields.

In the three-phase package type current transformer thus formed, since the first to third Rogowskii coils 3a to 3c are fixed in the interior of the pressure vessel 1 by using the insulating spacer 31, the structure for supporting the first to third Rogowskii coils 3a to 3c in the interior of the pressure vessel 1 can be simplified, thereby allowing downsizing of the current transformer.

Also, since the first to third Rogowskii coils 3a to 3c are fitted to the insulating spacer 31 through the metal adaptors 35a to 35c that also serve as the magnetic shield, the entrance of electromagnetic waves can be suppressed, thereby allowing improvements in detection precision.

The current transformer described in the fourth embodiment may be combined with the phase-to-phase magnetic shield 14, the outer peripheral magnetic shield 15 and the end magnetic shield 16 described in the first embodiment, thereby allowing further improvements in detection precision.

Further, the first to third metal adaptors 35a to 35c are made of a material high in conductivity (for example, copper or aluminum) in order to mitigate the influence of the magnetic field from alternating current components, a material high in magnetic permeability (for example, iron) in order to mitigate the influence of the magnetic field from direct current components, or a combination of those materials. As a result, the influence of electromagnetic waves from other phases can be efficiently removed.

In addition, although in the above-described first to fourth embodiments, the conductors 2a to 2c are disposed at the vertexes of an equilateral triangle in a section perpendicular to the longitudinal direction, the present invention is not limited to those arrangements. For example, the conductors 2a to 2c may be disposed at the vertexes of an isosceles triangle or may be disposed on a straight line.

In addition, even though the above-described first to fourth embodiments show the current transformers applied to a gas insulation switch device, they can be also applied to a gas insulation bus of the three-phase package type.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A three-phase current transformer received in a pressure vessel filled with an insulating gas, for detecting a current that flows in three three-phase conductors that are within the pressure vessel, said current transformer comprising:

a metal adaptor fixed inside the pressure vessel, and having first, second, and third conductor through-holes through which the three conductors respectively pass and first, second, and third annular recesses in said metal adaptor, respectively concentric with and spaced from the first, second, and third conductor through-holes; and first, second, and third air-core coils respectively disposed in the first, second, and third annular recesses, wherein said metal adaptor is at ground potential and is a magnetic shield.

2. The three-phase current transformer according to claim 1, wherein said metal adaptor comprises a single plate metal adaptor, and the first, second, and third conductor through-holes and the first, second, and third annular recesses are in said single plate metal adaptor.

3. The three-phase current transformer according to claim 2, wherein said metal adaptor has a surface parallel to a plane orthogonal to the three conductors, the first, second, and third annular recesses extend into said adaptor at said surface, and including a phase-to-phase magnetic shield that extends radially from a center of the pressure vessel, partitioning the pressure vessel into three regions, each of the regions including one of three conductors, and that is fixed to said coil insertion surface.

4. The three-phase current transformer according to claim 3, including a cylindrical outer peripheral magnetic shield that surrounds the three conductors.

5. The three-phase current transformer according to claim 3, including a plate end magnetic shield having three holes through which the three conductors respectively pass, fixed to an end portion of said phase-to-phase magnetic shield, opposite said metal adaptor.

6. The three-phase current transformer according to claim 1, wherein said metal adaptor includes a first metal plate having the first conductor through-hole and the first annular recess therein, a second metal plate having the second conductor through-hole and the second annular recess therein, and a third metal plate having the third conductor through-hole and the third annular recess therein; and said first, second, and third metal plates are fixed to each other.

7. The three-phase current transformer according to claim 6, wherein positions of said first, second, and third metal plates are displaced from each other in a longitudinal direction of the three conductors, and said first, second, and third metal plates are partially bonded to each other at surfaces in the longitudinal direction of the three conductors.

8. The three-phase current transformer according to claim 1, wherein each of said first, second, and third air-core coils comprises a Rogowskii coil.

* * * * *